(12) United States Patent
Kim et al.

(10) Patent No.: US 8,988,523 B1
(45) Date of Patent: Mar. 24, 2015

(54) SINGLE-CAMERA MULTI-MIRROR IMAGING METHOD AND APPARATUS FOR WHOLE-SURFACE INSPECTION OF ROTATING OBJECTS

(71) Applicant: The United States of America as represented by the Secretary of Agriculture, Washington, DC (US)

(72) Inventors: Moon S. Kim, Silver Spring, MD (US); Kuanglin Chao, Ellicott, MD (US); Byoung-Kwan Cho, Daejeon (KR); Kangjin Lee, Hwasung-si (KR)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/782,399

(22) Filed: Mar. 1, 2013

(51) Int. Cl.
*H04N 7/18* (2006.01)
*B07C 5/342* (2006.01)
*G06K 9/32* (2006.01)
*H04N 5/225* (2006.01)

(52) U.S. Cl.
CPC .............. *B07C 5/342* (2013.01); *G06K 9/3233* (2013.01)
USPC .......... 348/89; 348/92; 348/207.99; 348/340; 382/110

(58) Field of Classification Search
USPC ................. 348/89, 92, 207.99, 340; 382/110
See application file for complete search history.

(56) References Cited

U.S. PATENT DOCUMENTS

| | | | | |
|---|---|---|---|---|
| 4,645,080 | A | * | 2/1987 | Scopatz ........................ 209/558 |
| 4,726,898 | A | | 2/1988 | Mills et al. |
| 4,825,068 | A | * | 4/1989 | Suzuki et al. ............. 250/223 R |
| 5,917,926 | A | * | 6/1999 | Leverett ....................... 382/110 |
| 6,691,854 | B1 | | 2/2004 | De Greef |
| 6,888,082 | B1 | | 5/2005 | Blanc |
| 7,280,198 | B2 | | 10/2007 | Blanc |
| 7,787,111 | B2 | * | 8/2010 | Kim et al. ...................... 356/73 |
| 8,520,220 | B2 | * | 8/2013 | Krakenes et al. ............. 356/612 |

FOREIGN PATENT DOCUMENTS

GB WO94/15173 * 7/1994 ............ G01B 11/24

* cited by examiner

*Primary Examiner* — Ngoc-Yen Vu
(74) *Attorney, Agent, or Firm* — Robert D. Jones; John D. Fado; Lesley Shaw

(57) ABSTRACT

The single-camera multi-mirror imaging method and apparatus is an inspection system configured to examine a whole surface of a rotating object, preferably a spheroidal object such as a fruit or vegetable. The system includes a plurality of mirrors that direct an image of the inspected object into a digital line scan camera with an associated processor. The processor produces an image of the inspected object showing any detected surface defects and selected contamination on the outer surface of the object.

16 Claims, 3 Drawing Sheets

SINGLE-CAMERA MULTI-MIRROR IMAGING METHOD AND APPARATUS FOR WHOLE-SURFACE INSPECTION OF ROTATING OBJECTS

FIELD OF THE INVENTION

The disclosed method and apparatus relates to imaging a whole surface of a rotating object. Specifically, the method and apparatus relates to imaging a whole surface of a spheroidal rotating object using a single camera and a plurality of mirrors.

BACKGROUND OF THE INVENTION

Currently, the most common method for inspecting essentially spherical objects (such as fruits and vegetables) involves production line personnel visually inspecting the objects as the objects are conveyed along a production line. However, the human visual inspection process is both slow and unreliable and some contaminating materials (such as fecal matter and bacterial contamination) that pose serious health risks are hard to identify particularly on a moving production line. Further, the inspected objects are not generally rotated so that all surfaces of the object are visible to the inspector.

To address these vulnerabilities, fruit and vegetable processors are developing machine vision systems to identify defects and contaminants. One example of such a system is disclosed in U.S. Pat. No. 7,787,111 to Kim et al. (hereinafter "Kim"), which is hereby incorporated by reference. The system disclosed by Kim comprises a rapid online line-scan imaging system capable of both hyperspectral/multispectral reflectance and fluorescence imaging. Reflectance imaging at multiple wavelengths detects quality and surface anomalies, while fluorescence imaging at multiple wavelengths is used to detect fecal matter and other types of bacterial contamination.

Although these examination tools and techniques improve the inspection process, the imaging systems are complex and expensive. For example, in accordance with Kim, multiple cameras may be required to adequately inspect all surfaces of a spheroid. Further, the data collected from all cameras must be processed and synchronized to accurately portray the three-dimensional spheroidal object. For maximum efficiency and minimal error, synchronization and processing should occur almost immediately to ensure that defective objects are not comingled with non-defective items.

The current invention simplifies the imaging process by providing an imaging system that utilizes only one camera and associated processor. The system described herein quickly and effectively gathers the imaging data and processes the data to produce a two-dimensional concatenated "image cube" that allows for the identification of essentially all surface defects as well as selected types of bacterial (including fecal) contamination.

SUMMARY OF THE INVENTION

This disclosure is directed to an inspection system which includes a plurality of peripheral image collecting mirrors positioned around a targeted rotating object. The peripheral mirrors direct reflected images of the object to a central collecting mirror. The central collecting mirror directs the reflected images to a camera with an associated processor. The processor receives the images from the camera and produces image data for the object. The inspected object is retained or rejected based on the image data.

The disclosure is also directed to a method of inspecting a targeted object. In accordance with the method, a plurality of peripheral image collecting mirrors are positioned so that each of the peripheral image collecting mirrors attains an image of the inspected object. Images of the inspected object are directed from each of the peripheral image collecting mirrors to a central collecting mirror. The central collecting mirror directs the images to a camera and an associated processor. The images are processed so that a decision is made to retain or reject the inspected object based on the processed images of the object.

The disclosure is further directed to a method of inspecting a spheroidal object. At least one mirror is positioned around the object and the object is rotated. Images of the object are reflected from the mirror into a digital line scan camera with an associated processor. The processor produces an image of the object showing any detected surface defects and any detected contamination that is present on an outer surface of the object.

DETAILED DESCRIPTION OF PREFERRED EMBODIMENTS

Figure 1:
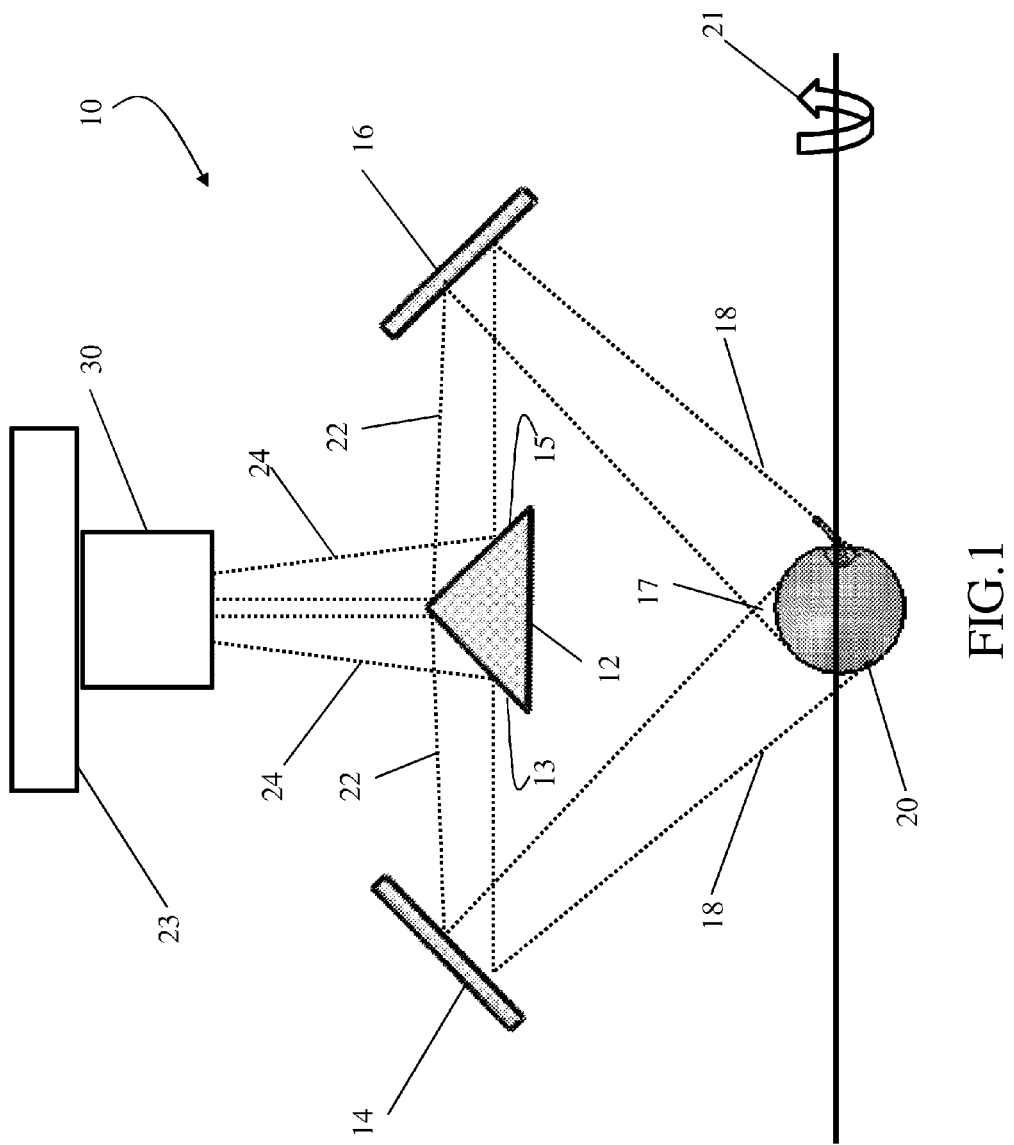
FIG. 1 is a schematic of the current inspection system positioned to inspect a rotating spheroid.

As generally shown in FIG. 1, the method and apparatus described herein comprises an inspection system 10 that includes a central image-consolidating mirror 12, and a plurality of peripheral image collecting mirrors 14, 16. As an inspected object 20 rotates (in the direction of the arrow 21), the inspection system 10 collects and processes a line scan image of the object 20 to determine whether the object 20 is rejected or retained for further processing.

In the preferred embodiment, as best shown by the dashed lines 18, an image of a rotating spheroidal object 20 is collected by the two peripheral first-surface mirrors 14, 16. A portion of the images collected from each of the respective mirrors 14, 16 create an overlap area 17. The mirrors 14, 16 are angled inwardly toward the object 20 at approximately 45°. As best shown by the dashed lines 22, the images collected by the peripheral mirrors 14, 16 are then directed to the central collecting mirror 12.

Although not specifically shown in the drawings, the inspection system 10 includes a lighting system that illuminates the rotating object 20, as disclosed (for example) in Kim. Specifically, the lighting system may include a quartz-tungsten halogen (QTH) reflectance lamp. Near infrared (NIR) light emitting diodes (LEDs) or an NIR laser with (or without) a long pass filter can also be used as a reflectance lamp. The lighting system may also include a micro discharge lamp (MDL)-high intensity ultraviolet light. LEDs, a laser, or a pressurized vapor lamp can also be used for fluorescence excitation. The system may further include long pass filters and a variety of other lighting and camera accessory equipment, as required to elicit reflectance, fluorescence, or other responses useful in detecting defects or contamination on the inspected object.

As generally shown in FIG. 1, the central collecting mirror 12 comprises a first surface mirror with opposing faces 13, 15 positioned so that each face 13, 15 collects an image from a respective peripheral mirror 14, 16. As indicated by the dashed lines 24, the images collected by the central collecting mirror 12 are reflected into a digital line scan camera 30 and processed by an associated processor 23.

In the preferred embodiment, the central collecting mirror 12 comprises a prism-shaped triangular polyhedron with two mirrored faces, i.e. the mirror body 12 has a rectangular base and oppositely disposed rectangular sides (which comprise first surface mirror faces 13, 15) with parallel oppositely disposed triangular surfaces forming the respective ends. However, the only critical elements of the central collecting mirror 12 are the orientation of the mirror's faces 13, 15 relative to the peripheral image collecting mirrors 14, 16 and the camera 30. In the preferred embodiment, the mirrored faces 13, 15 have one abutting edge and form a relative angle of approximately 90°. However, in alternative embodiments, other relative angles and configurations should be considered within the scope of this disclosure.

Figure 2:
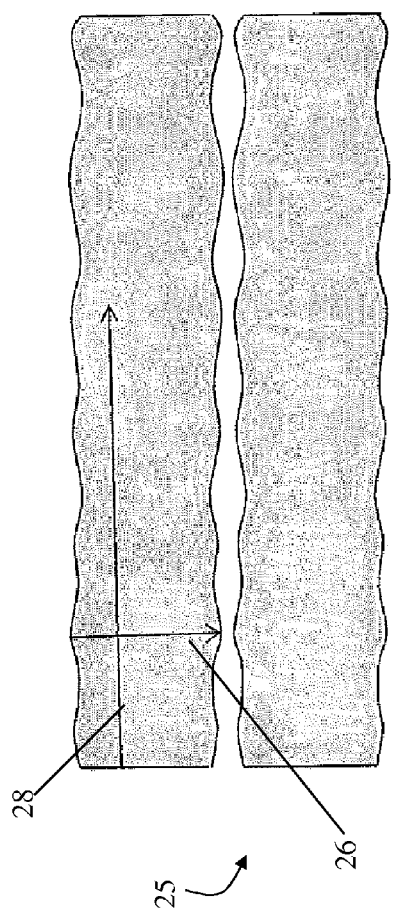
FIG. 2 is a concatenated image of the rotating spheroid shown in FIG. 1.
Figure 3:
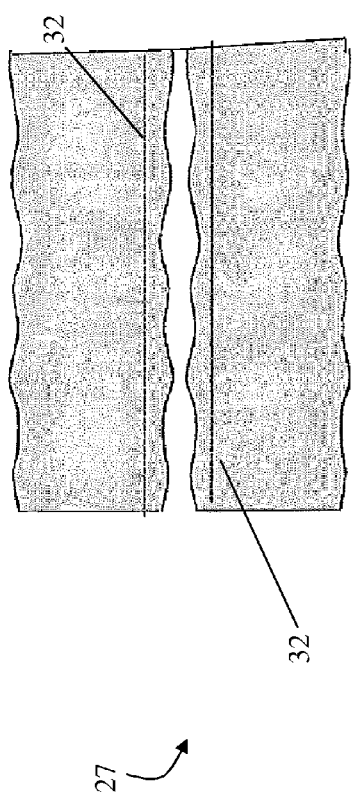
FIG. 3 is the concatenated spheroid image of FIG. 2 modified so that the image shows one rotation of the spheroid.
Figure 4:
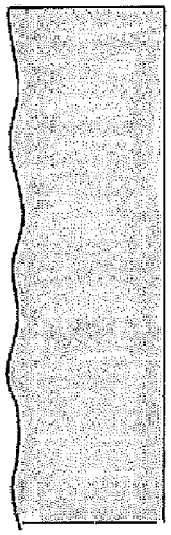
FIG. 4 is the concatenated spheroid image of FIG. 3 after removal of overlapping portions of the image.

As shown in FIG. 2, once the images are collected and communicated to the processor 23, the processor 23 translates the images into image data and creates a concatenated image 25 of the surface of the spheroid 20 as the spheroid 20 rotates. Processing software measures the diameter 26 of the spheroid 20 (as reflected by the concatenated spheroid image 25) and calculates the amount of rotation (as expressed by the distance 28) for the spheroid 20 to travel one complete rotation. The image 25 shown in FIG. 2 is then cropped to form a concatenated image 27 that represents one rotation of the spheroid, as shown in FIG. 3. The area between the dashed lines 32 (shown in FIG. 3) is a portion of the overlap between the images gathered by each of the peripheral mirrors 14 and 16. The overlap area 17 is best shown in FIG. 1. FIG. 4 shows a modified concatenated image 29 after removal of the overlap area 32 identified in FIG. 3.

Figure 5:
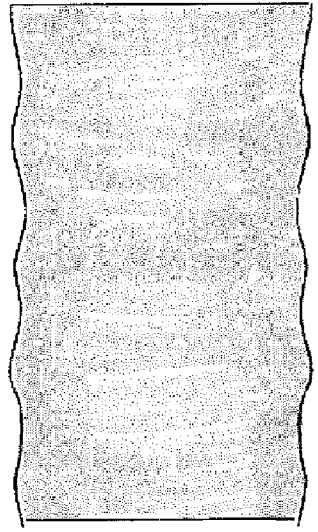
FIG. 5 is an image cube representing the spheroid shown in FIG. 1, as modified in FIGS. 2-4.

In FIG. 5, the two separate portions of the image 29 are joined to create a single "image cube" 31. The image cube 31 comprises a concatenated line scan image of the complete outer surface of the spheroid 20. The image cube 31 incorporates and displays any surface defects collected from the reflectance scan as well as any contamination resulting from the fluorescence scan—using a fluorescence scanning apparatus such as the apparatus disclosed in Kim. The image cube data is then scrutinized based on pre-determined contamination and defect standards (expressed as defect/contamination thresholds). Examined objects that are determined to meet the standards are retained for further processing and objects that are substandard are rejected.

Although the preferred embodiment comprises two fixed stationary peripheral mirrors 14, 16 angled at approximately 45° and directed into a two-faced image collecting mirror 12, more than two mirrors may be used with an image collecting mirror 12 having a corresponding number of faces. Further, the angles of the peripheral mirrors 14, 16 and the corresponding faces of the image collecting mirror 12 may have a different fixed angle or may change angles and positions as the spheroid 20 is rotated. Additionally, although the spheroid 20 rotates in an essentially horizontal plane, the plane of rotation may be varied so that selected surfaces of the rotating spheroid 20 are more clearly visible.

For the foregoing reasons, it is clear that the method and apparatus provides an innovative system for inspecting three dimensional objects, preferably spheriodal objects on a conveyance line. The system may be modified in multiple ways and applied in various technological applications. For example, although the method and apparatus described herein is generally directed to spheroidal food products, in alternative embodiments, the device may have some application to the inspection of non-spheroidal food or non-food items (such as manufactured products).

The current method and apparatus may be modified and customized as required by a specific operation or application, and the individual components may be modified and defined, as required, to achieve the desired result. Although the materials of construction are not described, they may include a variety of compositions consistent with the function described herein. Such variations are not to be regarded as a departure from this disclosure's spirit and scope, and all such modifications as would be obvious to one skilled in the art are intended to be included within the scope of the following claims.

What is claimed is:

1. A defect and contamination inspection system comprising:
    a rotating object;
    a plurality of peripheral image collecting mirrors directed to the object;
    a central collecting mirror, the peripheral mirrors directing a reflected image of the object to the central collecting mirror; the central collecting mirror comprising a prism-shaped polyhedron having multiple faces so that each of the faces is directed to one of the image collecting mirrors;
    no more than one camera, the central collecting mirror directing the reflected images to the camera;
    a processor receiving the images from the camera and producing a concatenated surface image of the object;
    wherein the inspection system is structured so that the object is retained or rejected based on the image data.

2. The inspection system of claim 1 wherein the system comprises a food inspection system.

3. The inspection system of claim 1 wherein the rotating object is a spheroid.

4. The inspection system of claim 1 wherein the rotating object rotates about a central horizontally-oriented axis.

5. The inspection system of claim 1 wherein the rotating object comprises one of a fruit or a vegetable.

6. The inspection system of claim 1 wherein the plurality of peripheral image collecting mirrors comprises two oppositely disposed image collecting mirrors.

7. The inspection system of claim 6 wherein the central collecting mirror comprises two faces so that each of the faces is directed to one of the peripheral image collecting mirrors.

8. The inspection system of claim 7 wherein the two faces of the central collecting mirror are about 90° apart.

9. The inspection system of claim 7 wherein the central collecting mirror is positioned between the peripheral image collecting mirrors.

10. The inspection system of claim 1 wherein the peripheral image collecting mirrors and the central collecting mirror comprise first surface mirrors.

11. The inspection system of claim 1 wherein the camera comprises a line scan digital camera.

12. The inspection system of claim 1 wherein the processor produces an image cube comprising an image of an outer surface of the object through one complete rotation of the object, the image cube showing outer surface defects and selected outer surface contamination on the object.

13. The inspection system of claim 12 wherein the outer surface defects on the object are apparent from a reflectance scan of the object, and the contamination on the object is apparent from a fluorescence scan of the object.

14. A method of inspecting an object for defects and contamination, the method comprising the steps of:
   (a) rotating the object;
   (b) positioning a plurality of peripheral image collecting mirrors so that each of the peripheral image collecting mirrors attains an image of the object;
   (c) directing the images of the object from the peripheral image collecting mirrors to a central collecting mirror; the central collecting mirror comprising a prism-shaped polyhedron having multiple faces so that each of the faces is directed to one of the image collecting mirrors;
   (d) directing the images of the object from the central collecting mirror to a no more than one camera, the camera being in communication with an associated processor;
   (e) processing the images to produce a concatenated image of the object so that a decision is made to retain or reject the object based on the processed images of the object.

15. The method of claim 14 wherein, in step (b), there are two first surface peripheral image collecting mirrors.

16. The method of claim 14 wherein, in step (e), the processor produces an image cube comprising an image of an outer surface of the object through one complete rotation of the object, the image cube showing outer surface defects and selected outer surface contamination on the object.

* * * * *